United States Patent [19]

Lasoen

[11] Patent Number: 5,507,704
[45] Date of Patent: Apr. 16, 1996

[54] TRANSMISSIONS

[75] Inventor: Jean J. Lasoen, Villepreux, France

[73] Assignee: Massey-Ferguson S.A., France

[21] Appl. No.: 146,091

[22] PCT Filed: Feb. 26, 1993

[86] PCT No.: PCT/EP93/00445

§ 371 Date: Nov. 4, 1993

§ 102(e) Date: Nov. 4, 1993

[87] PCT Pub. No.: WO93/17889

PCT Pub. Date: Sep. 16, 1993

[30] Foreign Application Priority Data

Mar. 5, 1992 [GB] United Kingdom .................. 9204794

[51] Int. Cl.$^6$ .............................. F16H 3/54; F16H 37/06
[52] U.S. Cl. ...................... 475/295; 475/316; 74/15.66
[58] Field of Search .................................. 475/295, 314, 475/315, 316; 74/15.63, 15.6, 15.66, 15.8; 192/3.52

[56] References Cited

U.S. PATENT DOCUMENTS

| | | | |
|---|---|---|---|
| 3,487,726 | 1/1970 | Burnett ..................................... | 475/316 |
| 4,420,992 | 12/1983 | Windish ..................................... | 475/295 |
| 4,528,872 | 7/1985 | Umemoto et al. ....................... | 475/142 |
| 4,549,443 | 10/1985 | White ........................................ | 74/360 |
| 4,649,771 | 3/1987 | Atkinson et al. ........................ | 475/316 |
| 4,685,343 | 8/1987 | Ehrlinger et al. ........................ | 74/331 |
| 4,788,886 | 12/1988 | Nussbaumer et al. ................ | 74/665 T |
| 4,811,614 | 3/1989 | Lasoen ..................................... | 74/15.63 |

FOREIGN PATENT DOCUMENTS

| | | |
|---|---|---|
| 0128251 | 12/1984 | European Pat. Off. . |
| 0390335 | 10/1990 | European Pat. Off. . |
| 3217048 | 7/1983 | Germany . |
| 1684111 | 10/1991 | U.S.S.R. . |

*Primary Examiner*—Charles A. Marmor
*Assistant Examiner*—Sherry Estremsky
*Attorney, Agent, or Firm*—MacMillan, Sobanski & Todd

[57] ABSTRACT

A combined powershift transmission and main clutch assembly for a vehicle includes a casing containing an input shaft and an output shaft. A planetary transmission is disposed within the casing and is co-axially mounted around the input shaft. The planetary powershift unit includes a sun gear and an annulus gear interconnected by one or more planet gears carded on a planet carder. A first one of the sun gear, the annulus gear, and the planet carder is connected to the input shaft, while a second one of the sun gear, the annulus gear, and the planet carder acts as an output member of the planetary powershift unit. A first clutch is disposed within the casing and co-axially surrounds the output shaft for drivingly connecting the output member of the planetary powershift unit with the output shaft. A second clutch is disposed within the casing and co-axially surrounds the input shaft for selectively clutching a third one of the sun gear, the annulus gear, and the planet carder for co-rotation with one of the first element of the planetary powershift unit, the second element of the planetary powershift unit, and the casing so as to select an operative gear ratio of the powershift unit. A power-take off shaft is connected to the input shaft and extends co-axially therefrom within the output shaft.

19 Claims, 1 Drawing Sheet

TRANSMISSIONS

This invention relates to transmissions and in particular, though not exclusively, to transmissions for use in tractor drive lines.

It is well known to use a planetary powershift gear unit as one element in a series connection of units which together form a tractor transmission. It is also well known to use a multi-plate oil-immersed clutch as a main transmission drive clutch in tractor applications.

It is an object of the present invention to provide a combined powershift and main clutch assembly which is suitable for use in a tractor drive line and which is particularly compact, reliable and readily installed in an existing tractor transmission housing.

SUMMARY OF THE INVENTION

A combined powershift and main clutch assembly for a vehicle transmission comprising a casing containing:

an input shaft, an output shaft, a planetary powershift unit coaxially mounted around the input shaft and driven therefrom, a main multi-plate clutch coaxially surrounding the output shaft for drivingly connecting an output member of the powershift unit with the output shaft, and a power-take-off shaft connected to the input shaft and extending coaxially within the output shaft.

The powershift unit preferably includes a secondary clutch means coaxially surrounding the input shaft within the casing for selecting the operative ratio of the powershift unit.

The powershift unit may comprise a sun gear and an annulus gear inter- connected by one or more planet gears carried on a planet carrier, one element of the said sun, annulus or carrier being connected to the input shaft, a second element of said sun, annulus or carrier acting as the output member of the powershift and the third element of said sun, annulus or carrier being clutchable by the secondary clutch means either for co-rotation with the first or a second element or to the casing of the assembly.

The carrier is preferably connected to the input shaft, the annulus gear acts as the output member of the powershift and the sun gear surrounds the input shaft and is clutchable by the secondary clutch means to either the carrier or the casing.

The carrier is preferably splined onto the input shaft by a sleeve portion which surrounds the input shaft, the power take off shaft also being splined to the same sleeve portion.

The secondary clutch means may conveniently comprise a first clutch which is spring-engaged to drivingly connect said third element to said first or second element to provide the unitary or lock-up condition of the powershift unit and a second hydraulically-engaged clutch which clutches said third element to said casing to provide a planetary ratio of the powershift unit.

The main multi-plate clutch is preferably engaged by an annular piston which surrounds the output and power-take-off shafts.

BRIEF DESCRIPTION OF THE DRAWINGS

One embodiment of the present invention will now described, by way of an example only, with reference to the accompanying FIG. 1 which is a vertical section through a tractor transmission assembly embodying the present invention.

BRIEF DESCRIPTION OF THE PREFERRED EMBODIMENT

Figure 1:
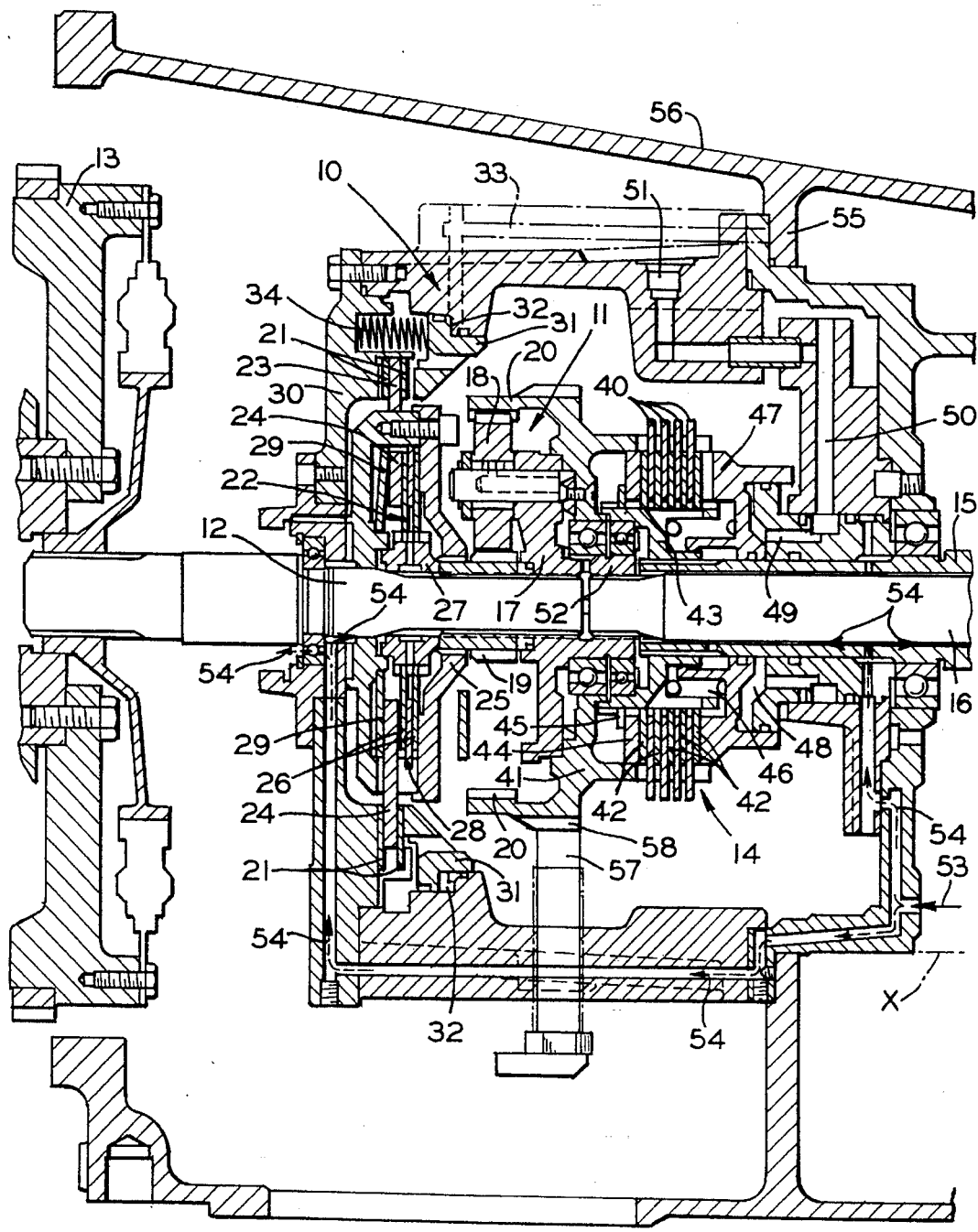

Referring to the drawing, a tractor transmission assembly 10 comprises a two-speed planetary powershift unit 11 coaxially mounted around input shaft 12 which is driven directly from an engine flywheel 13. A main multi-plate oil-immersed clutch 14 coaxially surrounds a hollow output shaft 15 within which a power-take-off (pto) shaft 16 extends. Output shaft 15 is connected to further transmission stages, for example, a synchromesh gearbox (not shown), to complete the tractor transmission.

The 2-speed powershift unit 11 comprises an input member in the form of a planet carrier 17 which is splined onto input shaft 12 via a sleeve portion 52, carrier 17 carries planet gears 18 which mesh with a sun gear 19 which rotatably surrounds the input shaft 12 and also with annulus gear 20, which acts as the output member of the powershift unit.

The operative ratio of the powershift unit is changed by a secondary clutch means in the form of a first clutch 22 which is spring engaged and a second clutch 23 which is hydraulically engaged. The first and second clutches are interlinked by a common clutch member 24 which forms part of both clutches.

Common clutch member 24 is supported on carrier 25 which is splined onto sun gear 19. Clutch discs 26 are splined onto a sleeve 27 which is in turn splined onto input shaft 12. Thus clutch discs 26 are in effect connected with planet carrier 17 via input shaft 12. The first clutch 22 is completed by a further clutch disc 28 which is splined onto carrier 25 and a belleville spring 29 which biases the common clutch member 24 against the interleaved clutch discs 26, 28 in order to connect the planet carrier 17 with the sun gear 19 to lock-up the powershift unit and provide a first unitary ratio of the unit.

The second clutch 23 comprises the common clutch member 24 which can be clutched to the casing 30 of the assembly between clutch discs 21, which are carried on the casing, by an annular piston 31 which is displaced by pressurising a chamber 32 via a passageway 33. Normally the second clutch 23 is held disengaged by return springs 34, as shown in the top half of the drawing. When chamber 32 is pressurised, the common clutch member 24 is gripped between the piston 31 and the housing 30 to clutch the sun gear 19 to the casing via carrier 25 in order to provide the planetary ratio of the powershift unit 11.

As will be appreciated, because the clutch member 24 is common to both the first and second clutches, when the second clutch is engaged the movement of the common clutch member 24 compresses belleville spring 29 and automatically disengages the first clutch 22, as shown in the bottom half of the accompanying drawing.

Main clutch 14 comprises a first set of clutch discs 40 which are rotationally connected to an extension 41 of annulus gear 20 and a second set of clutch discs 42 which are splined onto a sleeve 43 which is itself splined onto output shaft 15. A pressure plate 44 is retained on sleeve 43 by a circlip 45 and the clutch is engaged against the action of spring 46 by an annular piston 47, which surrounds the output shaft 15. Piston 47 is axially displaced to engage the clutch by pressurising chamber 48 via passageway 49, 50, 51.

The power-take-off shaft 16 which extends within the hollow output shaft 15 is splined onto the sleeve portion 52 of the planet carrier 17, so that the power-take-off shaft is directly driven from the input shaft 12 via sleeve portion 52.

The entire transmission assembly is contained within casing 30, which is continually supplied with oil for lubrication/cooling via inlet 53. As can be seen from the drawing, the oil supplied via inlet 53 flows as indicated by arrows 54 to lubricate/cool the various components of the assembly. Oil leaves the casing via apertures not in the plane of FIG. 1 to maintain an oil level typical as shown by dotted line X in tractor transmission housing 56. Bolts (not shown) secure casing 30 to a flange 55 provided within housing 56.

An electro-magnetic speed sensor 57 is provided which co-operates with teeth 58 provided on the outside of annulus gear.20 to provide an indication of transmission speed to a control system (not shown) for the transmission assembly and associated tractor.

The transmission assembly described above is particularly compact due to the small size of the sun gear 19 which enables the necessary planetary ratio of say 1:1.18 to 1:1.50 of the powershift unit to be achieved using a single epicyclic gear train without excessive diameter of the annulus gear 20. This small diameter of the sun gear 19 is achieved as the input shaft is connected to the pro shaft so that sun gear 19 is only required to surround the input shaft 12 and not, as is common in most tractor applications, to surround a hollow (and therefore larger diameter) output shaft down the centre of which a power-take-off shaft also extends. This obviates the need to use a compound epicyclic gear train to achieve the desired small planetary ratio without excessive gear diameter.

Also, the provision of a multi-plate oil-immersed main clutch immediately adjacent to the powershift unit and contained within the same housing 30 further significantly improves the practicality of the overall assembly which, due to its coaxial input and output shafts, can easily be installed within an existing tractor transmission housing to convert an existing tractor transmission to powershift/wet clutch operation. The positioning of the main clutch on the output side of the powershift unit also reduces the inertia which any synchronizers in the further transmission stages connected with output shaft 15 have to absorb.

What is claimed is:

1. A combined powershift transmission and clutch assembly for a vehicle comprising:

a casing containing an input shaft and an output shaft;

a planetary powershift unit disposed within said casing and co-axially mounted around said input shaft, said planetary powershift unit including a sun gear and an annulus gear interconnected by one or more planet gears carried on a planet carder, a first element of said sun gear, said annulus gear, and said planet carrier being connected to said input shaft, a second element of said sun gear, said annulus gear, and said planet carrier acting as an output member of said powershift unit;

a first clutch disposed within said casing and co-axially surrounding said output shaft for drivingly connecting said output member of said planetary powershift unit with said output shaft;

a second clutch disposed within said casing and co-axially surrounding said input shaft for selectively clutching a third element of said sun gear, said annulus gear, and said planet carrier for co-rotation with one of said first element of said planetary powershift unit, said second element of said planetary powershift unit, and said casing so as to select an operative gear ratio of said planetary powershift unit; and a power-take off shaft connected to said input shaft and extending co-axially therefrom within said output shaft.

2. The combined powershift transmission and clutch assembly defined in claim 1 wherein said planet carrier is connected to said input shaft.

3. The combined powershift transmission and clutch assembly defined in claim 1 wherein said annulus gear acts as said output member of said powershift unit.

4. The combined powershift transmission and clutch assembly defined in claim 1 wherein said second clutch selectively clutches said sun gear with either said planet carrier or said casing.

5. The combined powershift transmission and clutch assembly defined in claim 1 wherein said carrier is splined onto said input shaft by a sleeve portion which surrounds said input shaft.

6. The combined powershift transmission and clutch assembly defined in claim 5 wherein said power take off shaft is splined to said sleeve portion.

7. The combined powershift transmission and clutch assembly defined in claim 1 wherein said second clutch includes a first and second clutch portions, said first clutch portion being spring-engaged to drivingly connect said third element of said planetary powershift unit to either of said first and second elements of said planetary powershift unit, said second clutch portion being hydraulically-engaged to clutch said third element of said planetary powershift unit to said casing.

8. The combined powershift transmission and clutch assembly defined in claim 1 wherein said first clutch is a multi-plate clutch which is engaged by an annular piston which surrounds said output shaft.

9. The combined powershift transmission and clutch assembly defined in claim 1 wherein said casing defines an interior which is supplied with oil.

10. A combined powershift transmission and clutch assembly for a vehicle comprising:

a casing;

an input shaft and an output shaft extending through respective input and output portions defined thereby within said casing;

a planetary powershift unit disposed within said input portion of said casing and co-axially mounted around said input shaft, said planetary powershift unit including a sun gear and an annulus gear interconnected by one or more planet gears carried on a planet carrier, a first element of said sun gear, said annulus gear, and said planet carrier being connected to said input shaft, a second element of said sun gear, said annulus gear, and said planet carrier acting as an output member of said powershift unit;

a clutch disposed within said output portion of said casing and co-axially surrounding said output shaft for drivingly connecting said output member of said planetary powershift unit with said output shaft; and a power-take off shaft connected to said input shaft and extending co-axially therefrom within said output shaft.

11. The combined powershift transmission and clutch assembly defined in claim 10 wherein said clutch is a first clutch, and further including a second clutch disposed within said casing and co-axially surrounding said input shaft for selectively clutching a third element of said sun gear, said annulus gear, and said planet carrier for co-rotation with one of said first element of said planetary powershift unit, said second element of said planetary powershift unit, and said casing so as to select an operative gear ratio of said planetary powershift unit.

12. The combined powershift transmission and clutch assembly defined in claim 11 wherein said planet carrier is connected to said input shaft.

13. The combined powershift transmission and clutch assembly defined in claim 11 wherein said annulus gear acts as said output member of said powershift unit.

14. The combined powershift transmission and clutch assembly defined in claim 11 wherein said second clutch selectively clutches said sun gear with either said planet carrier or said casing.

15. The combined powershift transmission and clutch assembly defined in claim 11 wherein said carrier is splined onto said input shaft by a sleeve portion which surrounds said input shaft.

16. The combined powershift transmission and clutch assembly defined in claim 15 wherein said power take off shaft is splined to said sleeve portion.

17. The combined powershift transmission and clutch assembly defined in claim 11 wherein said second clutch includes a first and second clutch portions, said first clutch portion being spring-engaged to drivingly connect said third element of said planetary powershift unit to either of said first and second elements of said planetary powershift unit, said second clutch portion being hydraulically-engaged to clutch said third element of said planetary powershift unit to said casing.

18. The combined powershift transmission and clutch assembly defined in claim 11 wherein said first clutch is a multi-plate clutch which is engaged by an annular piston which surrounds said output shaft.

19. The combined powershift transmission and clutch assembly defined in claim 11 wherein said casing defines an interior which is supplied with oil.

\* \* \* \* \*